(12) United States Patent
Scoggins et al.

(10) Patent No.: US 8,071,510 B2
(45) Date of Patent: Dec. 6, 2011

(54) METHOD OF INCREASING LUBRICITY OF BRINE-BASED DRILLING FLUIDS AND COMPLETION BRINES

(75) Inventors: William Chrys Scoggins, Celle (DE); Mingjie Ke, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 191 days.

(21) Appl. No.: 12/174,599

(22) Filed: Jul. 16, 2008

(65) Prior Publication Data

US 2010/0016180 A1 Jan. 21, 2010

(51) Int. Cl.
*C09K 8/36* (2006.01)
*C09K 8/32* (2006.01)
*C09K 8/06* (2006.01)
*C09K 8/16* (2006.01)
*C09K 8/22* (2006.01)
*E21B 29/02* (2006.01)
*E21B 43/22* (2006.01)

(52) U.S. Cl. ........ 507/135; 507/134; 507/136; 507/138; 507/139; 175/65; 175/270.1

(58) Field of Classification Search .................. 507/135, 507/134, 136, 138, 139; 175/65, 270.1
See application file for complete search history.

(56) References Cited

U.S. PATENT DOCUMENTS

| | | | |
|---|---|---|---|
| 2,995,514 A * | 8/1961 | Jordan et al. .................. 507/137 |
| 3,668,129 A | 6/1972 | Willett | |
| 3,761,410 A * | 9/1973 | Mondshine et al. .......... 507/134 |
| 4,356,096 A * | 10/1982 | Cowan et al. .................. 507/126 |
| 6,302,209 B1 | 10/2001 | Thompson, Sr. et al. | |
| 6,632,779 B1 | 10/2003 | Vollmer et al. | |
| 6,806,235 B1 | 10/2004 | Mueller et al. | |
| 6,894,008 B2 | 5/2005 | Walker | |
| 7,188,676 B2 | 3/2007 | Qu et al. | |
| 7,231,976 B2 | 6/2007 | Berry et al. | |
| 7,392,844 B2 | 7/2008 | Berry et al. | |
| 2007/0265171 A1 | 11/2007 | Javora et al. | |
| 2007/0287757 A1 * | 12/2007 | Kuhnle et al. .................. 516/76 |

FOREIGN PATENT DOCUMENTS

GB 1490317 A 11/1977

* cited by examiner

*Primary Examiner* — Timothy J. Kugel
*Assistant Examiner* — Atnaf Admasu
(74) *Attorney, Agent, or Firm* — John Wilson Jones; Jones & Smith, LLP

(57) ABSTRACT

The lubricity of a drilling fluid or a completion fluid may be increased by incorporating into the fluid a water-soluble or water-dispersible salt of a sulfonated (sulfated) vegetable oil or a derivative thereof, such as a sulfonated (sulfated) castor oil. Suitable derivatives include the sodium, potassium, calcium, magnesium or ammonium salt. A non-ionic or anionic surfactant which is capable of enhancing the solubility of the salt may further be incorporated into the drilling fluid or completion fluid.

31 Claims, No Drawings

METHOD OF INCREASING LUBRICITY OF BRINE-BASED DRILLING FLUIDS AND COMPLETION BRINES

FIELD OF THE INVENTION

The invention relates to a method of increasing the lubricity of a drilling fluid or a completion fluid by use of a sulfonated (sulfated) vegetable oil or derivative thereof.

BACKGROUND OF THE INVENTION

Drilling fluids or muds are commonly circulated in the well during drilling operations in order to cool and lubricate the drilling apparatus, lift cuttings out of the wellbore and counterbalance the subterranean formation pressure encountered during drilling. An important function of a drilling fluid is to reduce the considerable torque on the rotating drill stem caused by the friction between the outside of the drill pipe comprising the drill stem and the wall of the well and/or casing strings. Drilling through offsets, deep wells and highly deviated or horizontal wells results in increased frictional forces, increasing the demand on the lubricating properties of the drilling fluids.

After drilling a well to the total depth, it is a normal practice to replace the drilling mud with a completion fluid. A completion fluid is typically a solids-free (or acid soluble), non-damaging formulation, which is intended to minimize reductions in permeability of the producing zone. The density of the completion fluid is generally selected and controlled to ensure that the hydrostatic head or pressure of the fluid in the wellbore will match the hydrostatic pressure of the column of drilling fluid being displaced.

The oil and gas industry has used brines for well drilling and well completions for more than thirty years. High density brines have been found to have particular applicability in deep wells, such as those that descend 15,000 to 30,000 feet (4,500 to 10,000 meters). Exemplary of high density brines are sodium chloride, potassium chloride, calcium chloride, sodium bromide, calcium bromide, zinc bromide, potassium formate, cesium formate and sodium formate brines.

While high density brines have been found to be functional in providing the lubricity and viscosity of a well treatment fluid under extreme shear, pressure and temperature variances, they are often ineffective because they are unable to exhibit the constant lubricity which is required during high shear conditions.

During the operation of deep wells, as well as in extended reach and/or high angle wells, it is necessary for the brine-containing well treatment fluid to exhibit increased lubricity. The need for increased lubricity is most marked in those instances during wellbore cleanup, wireline operations, coil tubing operations and during the running of production tubulars.

The literature reports various additives for use as lubricating agents in drilling fluids as well as completion fluids. Many of the reported additives are not, however, compatible with clear brines or drilling fluids or completion fluids which have brine as a major component. In addition, many additives used as lubricating agents in drilling fluids and/or completion fluids today have presented environmental concerns and tend to be costly.

A need exists therefore for lubricating agents which may be used in brine-based drilling fluids and/or completion fluids. Such lubricating agents need to lower torque and drag by reducing metal to metal friction. Furthermore, they need to be useful in the prevention of differential sticking of downhole tubulars. Such lubricating agents further must be environmentally friendly.

SUMMARY OF THE INVENTION

The lubricity of a drilling fluid or a completion fluid may be increased and the coefficient of friction of the fluid may be decreased by incorporating into the drilling or completion fluid, as lubricating agent, a water-soluble or water-dispersible salt of a sulfonated (sulfated) vegetable oil or derivative thereof.

The lubricating agent is typically a sodium, potassium, calcium, magnesium or ammonium salt. In a preferred embodiment, the lubricating agent is a salt of sulfonated (sulfated) castor oil.

In addition to the sulfonated (sulfated) vegetable oil, a surfactant may further be incorporated into the drilling fluid or completion fluid which is capable of enhancing the solubility of the salt. The surfactant is typically a non-ionic or anionic surfactant, such as an ethoxylated alcohol. Exemplary ethoxylated alcohols are alkyl polyethylene glycol ethers including a $C_{10}$ alcohol ethoxylate, such as a $C_{10}$ alcohol ethoxylate which contains eight ethylene oxide units.

Further, a freezing point depressant may also be incorporated into the drilling fluid or completion fluid. Suitable freezing point depressants include $C_1$-$C_8$ alcohols, glycols, polyglycols and glycol ethers. Exemplary freezing point depressants include glycol ethers.

Typically, the lubricating agent and, optionally, surfactant and/or freezing point depressant are formulated as an aqueous fluid which is added to the brine of the drilling or completion fluid. Alternatively, these components may be added directly to the drilling or completion fluid.

DETAILED DESCRIPTION OF THE PREFERRED EMBODIMENTS

The lubricating agent described herein is effective in substantially increasing the lubricity or reducing the coefficient of friction of brine-based drilling fluids and brine fluids, such as brine-based completion fluids. Such drilling and completion fluids normally contain high density brines. A high density brine may typically include a brine having a density greater than about 8.4 pounds/gallon (ppg) (greater than about 1.0 kg/l), more typically from about 8.4 to about 22.5 ppg (from about 1.0 to about 2.7 kg/l), even more typically from about 9.0 to about 22.0 ppg (from about 1.1 to about 2.6 kg/l). While chloride and/or bromide salts of sodium, potassium, calcium and zinc are more commonly used, potassium formate, cesium formate and sodium formate brines are further often used.

The lubricating agent may be added directly to the drilling or completion fluid or may be formulated in an aqueous fluid which is then added to the brine of the drilling or completion fluid.

The lubricating agent is a water-soluble or water-dispersible salt of a sulfonated (sulfated) vegetable oil or derivative thereof. The salt of the lubricating agent is typically sodium, potassium, calcium, magnesium or ammonium. The lubricating agent is desirably biodegradable and not bio-accumulative, i.e., not fat soluble in fatty tissue of marine organisms. Such salts are prepared by reacting sulfuric acid with the vegetable oil or derivative.

The fatty acid which esterifies with the glycerol to form the vegetable oil typically contains one or more hydroxyl groups. The preferred vegetable oil is castor oil. The reaction of sulfuric acid and vegetable oil is principally a sulfation reaction though the sulfonate linkage may be formed by the reaction of the sulfuric acid with one or more of the double bonds. For instance, with castor oil, the three hydroxyl groups on the triglyceride of the ricinoleic acid react with sulfuric acid and thereby form a sulfate ester (C—O—S bond); a small portion reacts with the double bonds in a sulfonation reaction to form the C—S bond. For such reasons, the salt is herein described as being "sulfonated (sulfated)".

The lubricating agent is especially effective in drilling or completion fluids containing high density brine, including brackish water and field brines. The lubricating agent is generally stable up to temperatures of 300° F. and provides increased lubricity values, often greater than 25% and preferably greater than 35% reduction in the coefficient of friction, compared to untreated brines. The lubricating agent further exhibits a minimal amount or tendency to grease, foam, or emulsify when added to the brine.

In addition to the sulfonated (sulfated) vegetable oil, a surfactant may further be added to the drilling or completion fluid. Typically, the volume ratio of lubricating agent:surfactant is from about 5:9 to about 4:3.

While the sodium salt of the sulfonated (sulfated) vegetable oil or derivative functions as lubricating agent, the surfactant serves to solubilize the lubricating agent in water and the brine. As such, the surfactant is preferably a surfactant which is capable of enhancing the solubility of the salt. Typically, the surfactant is a non-ionic or anionic surfactant.

Suitable nonionic surfactants include those having a HLB between from 1 to about 20 are preferred, most preferably those having a HLB between from about 10 to about 20, as well as linear alcohol polyethylene oxide ethers, sorbitan monooleate polyethylene oxide ethers and polyethylene glycol (PEG) ester of fatty acids.

Suitable as nonionic surfactants are alkyl polyether alcohols such as linear or branched polyoxyethylene alcohols, more preferably linear polyoxyethylene alcohols, comprising (a) from about 8 to about 30, preferably about 8 to about 20, carbon atoms, and (b) comprising about 3 to about 50 moles, most preferably about 3 to about 20 moles, ethylene oxide. Most preferred non-ionic surfactants are linear polyoxyethylene alcohols having from about 13 to about 15 carbon atoms and comprising about 10 moles ethylene oxide.

Further nonionic surfactants are polyoxyethylene sorbitan monopalmitate, polyoxyethylene sorbitan monostearate, polyoxyethylene sorbitan monooleate, linear alcohol alkoxylates, alkyl ether sulfates, dioxane, ethylene glycol and ethoxylated castor oils such as polyethylene glycol castor oil, dipalmitoylphosphatidylcholine (DPPC), ethylene oxide sulfonates and highly substituted benzene sulfonates.

Most preferred as non-ionic surfactants are ethoxylated alcohols. Exemplary of these ethoxylated alcohols are ethoxylates of alkyl polyethylene glycol ethers including a $C_{10}$ alcohol ethoxylate, such as a $C_{10}$ alcohol ethoxylate which contains eight ethylene oxide units. Most preferred are $C_{10}$ alcohol ethoxylates, such as Lutensol® ON 80, a product of BASF.

Suitable anionic surfactants include are alkyl ether sulfates, alkylsulfonates, alkylisothionates and alkyltaurates or their salts, alkylcarboxylates, alkylsulphosuccinates or alkylsuccinamates, alkylsarcosinates, alkylated derivatives of protein hydrolysates, acylaspartates, and alkyl and/or alkylether and/or alkylaryl ether ester phosphates and phosphonates. The cation is generally an alkali or alkaline-earth metal such as sodium, potassium, lithium, magnesium or an ammonium group $NR_4^+$ where R, which may be identical or different, represents an alkyl and/or aryl group which may or may not be substituted by an oxygen or nitrogen atom.

Exemplary anionic surfactants include such alpha-olefin sulfonates are salts of a monovalent cation such as an alkali metal ion like sodium, lithium or potassium, an ammonium ion or an alkyl-substituent or hydroxyalkyl substitute ammonium in which the alkyl substituents may contain from 1 to 3 carbon atoms in each substituent. The alpha-olefin moiety typically has from 12 to 16 carbon atoms. Preferred alkyl ether sulfates are also salts of the monovalent cations referenced above. The alkyl ether sulfate may be an alkylpolyether sulfate and contains from 8 to 16 carbon atoms in the alkyl ether moiety. Preferred as anionic surfactants are sodium lauryl ether sulfate (2-3 moles ethylene oxide), $C_8$-$C_{10}$ ammonium ether sulfate (2-3 moles ethylene oxide) and a $C_{14}$-$C_{16}$ sodium alpha-olefin sulfonate and mixtures thereof. Especially preferred are ammonium ether sulfates.

Further, a freezing point depressant, for lowering the freezing point of the aqueous fluid containing the lubricating agent and, optionally, surfactant, may also be incorporated into the drilling fluid or completion fluid. Suitable freezing point depressants include $C_1$-$C_8$ alcohols, glycols such as ethylene glycol or propylene glycol, polyglycols such as polyethylene glycols or triethylene glycol and glycol ethers such as triethylene glycol and monoethylene glycol. A preferred freezing point depressant is monoethylene glycol. Typically, the volume ratio of lubricating agent:freezing point depressant is between from about 1:2 to about 1:3.

In an embodiment of the invention, a lubricating fluid containing the combination of lubricating agent and surfactant and/or freezing point depressant is used to increase the lubricity of a drilling or completion fluid. A preferred lubricating fluid contains from about 20 to about 30 volume percent of sulfonated (sulfated) vegetable oil, from about 15 to about 45 volume percent of surfactant and the balance being the freezing point depressant. In a most preferred embodiment, the sulfonated (sulfated) vegetable oil is turkey red oil 100% substituted (i.e., all three —OH groups on the castor oil are sulfated and then neutralized with caustic, the resultant being about 81% of the sodium salt, 18% water and 1% sodium sulfate), the surfactant is Lutensol®-ON 80 and the freezing point depressant is monoethylene glycol.

A lubricating treatment fluid may be formed by diluting the lubricating agent or lubricating fluid with an aqueous fluid. Such dilution decreases the viscosity and increases the solubility of the lubricating agent. A lubricating treatment fluid is typically formulated by combining the lubricating agent, with the optional surfactant and freezing point depressant, in an aqueous fluid. The lubricating treatment fluid may then be added to the brine of the drilling or completion fluid.

Generally, the aqueous fluid of the lubricating treatment fluid may be any water based fluid that is compatible with the formulation of a drilling fluid or completion fluid and which is compatible with the lubricating agent. For instance, the aqueous fluid of the lubricating treatment fluid may be fresh water, sea water, brine, mixtures of water and water soluble organic compounds and mixtures thereof. Further, the brine-based drilling fluid or completion fluid may consist of or include sea water.

The lubricating agent may be used to reduce the coefficient of friction or to increase the lubricity of any brine-based drilling fluid or completion fluid. The amount of lubricating agent employed is typically that amount which is sufficient to reduce metal-metal friction, for instance, an amount sufficient to reduce the friction between the drilling string and the casing string of the wellbore when used to reduce the coefficient of friction of a drilling fluid.

The exact amount of the lubricating treatment fluid present in the drilling or completion fluid may be determined by a trial and error method of testing the combination of drilling or completion fluid and lubricating treatment fluid and the reduction in friction achieved. Generally however, the lubricating treatment fluid may be used in drilling or completion fluids in a concentration from about 0.01% to about 6% by volume and more preferably in a concentration from about 0.05% to about 4% by volume.

An illustrative drilling fluid may be composed of an aqueous base fluid and a weighting agent. Optionally, the drilling fluid may include other conventional components such as fluid loss control agents, viscosifiers, etc.

The lubricating agent further is highly useful in reducing the coefficient of friction with brine-based completion fluids, especially those used to displace a brine-based drilling fluid.

The lubricating treatment fluid containing lubricating agent, and optional surfactant and/or freezing point depressant, with aqueous fluid may further define a drilling or completion fluid and as such, drilling or completion fluids containing these components are further included within the scope of the invention. As such, the invention encompasses a brine based drilling fluid exhibiting increased lubricity as compared to a conventionally formulated drilling fluid. One such illustrative brine based drilling fluid includes an aqueous base fluid and, optionally, a weighting agent along with an effective amount of at least one water-soluble or water-dispersible sulfonated vegetable oil or derivative thereof and, optionally, surfactant and/or freezing point depressant.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of volume units except as may otherwise be indicated.

EXAMPLES

Examples 1-11

A lubricating fluid was prepared by mixing turkey red oil [a sodium salt of sulfonated (sulfated) castor oil], a non-ionic surfactant and monoethylene glycol (MEG) at room temperature for approximately 30 minutes. The non-ionic surfactant was a water-soluble $C_{10}$ alcohol ethoxylate containing eight ethylene oxide units, commercially available as Lutensol® ON 80 from BASF (abbreviated in the Tables as "D-4G"). The appearance of the fluid was noted. The solubility of the lubricating fluid in various brines was then evaluated by introducing 1 volume percent of the lubricant in potassium chloride, sodium chloride and calcium chloride brines. The compositions showed excellent solubility in the tested brines, as shown in Table 1:

TABLE 1

| Example No. | Lubricating Fluid (wt.) | Fluid Appearance | 1% in 3% KCl | 1% in 5% NaCl | 1% in 10.6 ppg $CaCl_2$ |
|---|---|---|---|---|---|
| 1 | 30% turkey red oil 70% water | Clear | Cloudy | Cloudy | Precipitated |
| 2 | 5% turkey red oil 95% water | Cloudy | Cloudy | Cloudy | Cloudy |
| 3 | 10% turkey red oil 90% water | Cloudy | Cloudy | Cloudy | Cloudy |
| 4 | 30% D-4G 70% water | Clear | Clear | Clear | Clear |
| 5 | 15% turkey red oil 15% D-4G 70% water | Clear | Clear | Clear | Clear |
| 6 | 15% turkey red oil 15% D-4G 20% MEG 50% water | Clear | Clear | Clear | Clear |
| 7 | 5% turkey red oil 20% D-4G 20% MEG 55% water | Clear | Clear | Clear | Clear |
| 8 | 10% turkey red oil 40% D-4G 50% water | Clear | Clear | Clear | Clear |
| 9 | 5% turkey red oil 40% D-4G 55% water | Clear | Clear | Clear | Clear |
| 10 | 10% turkey red oil 20% D-4G 20% MEG 50% water | Clear | Clear | Clear | Clear |
| 11 | 10% turkey red oil 40% MEG 50% water | Cloudy | | | |

Examples 12-20

The lubricity of selected lubricating fluids were evaluated by an EP Lubricity Tester, manufactured by OFI Testing Equipment, Inc., wherein fluid resistance of the fluids was measured by the application of 150 inch-pounds of force (the equivalent of 5,000 to 10,000 psi—34,500 to 69,000 kPa—pressure on the fluid) between two hardened steel surfaces, a block and a ring rotating at 60 rpm. Table 2 sets for the coefficients of friction in the various brines at 70° F. at various concentrations [for instance, Example 13 shows a coefficient of friction of 0.128 at a 0.5% (vol.) of the lubricating fluids (Fluid No. 1)]:

TABLE 2

| Example No. | Lubricating Fluids corresponding to Example No. (wt.) | 3% KCl | 5% NaCl | 9.0 ppg NaCl | 10.6 ppg CaCl$_2$ |
|---|---|---|---|---|---|
| Comp. Ex. 12 | None (brine only) | 0.309 | 0.334 | 0.265 | Not tested (N.T.) |
| 13 | 1 | 0.128 at 0.5%<br>0.138 at 1.5% | N.T. | 0.169 at 0.5%<br>0.168 at 1.0% | N.T. |
| 14 | 4 | 0.265 at 0.5%<br>0.280 at 1.5% | N.T. | 0.210 at 0.5%<br>0.185 at 1.0% | N.T. |
| 15 | 5 | 0.118 at 0.5%<br>0.122 at 1.5% | N.T. | 0.103 at 0.5%<br>0.126 at 1.0% | N.T. |
| 16 | 6 | 0.132 at 0.5%<br>0.114 at 1.5% | N.T. | 0.132 at 0.5%<br>0.132 at 1.0% | N.T. |
| 17 | 7 | 0.119 at 0.5%<br>0.120 at 1.0% | 0.133 at 0.5% | N.T. | 0.113 at 1.0% |
| 18 | 8 | 0.100 at 0.5%<br>0.108 at 1.0% | 0.130 at 0.5%<br>0.120 at 1.0% | N.T. | 0.115 at 0.5%<br>0.125 at 1.0% |
| 19 | 9 | 0.132 at 0.5%<br>0.134 at 1.0% | 0.130 at 0.5%<br>0.124 at 1.0% | N.T. | 0.120 at 0.5%<br>0.120 at 1.0% |
| 20 | 10 | 0.121 at 0.5%<br>0.130 at 1.0% | 0.129 at 0.5%<br>0.123 at 1.0% | N.T. | 0.126 at 0.5%<br>0.120 at 1.0% |

Table 2 shows that the coefficients of friction in the tested brines were significantly reduced when the sodium salt of sulfonated castor oil was present. This is indicative of the effectiveness of the lubricating fluids in lowering torque and drag by reducing metal to metal friction. In addition, such data is illustrative of the ability of the lubricating fluids to prevent differential sticking of downhole tubulars.

From the foregoing, it will be observed that numerous variations and modifications may be effected without departing from the true spirit and scope of the novel concepts of the invention.

What is claimed is:

1. A method of increasing the lubricity or reducing the coefficient of friction of a drilling or completion fluid containing a brine by adding to the brine at least one water-soluble salt of a sulfonated (sulfated) vegetable oil or derivative thereof and an anionic or non-ionic surfactant, wherein the anionic or non-ionic surfactant solubilizes the salt of the sulfonated (sulfated) vegetable oil or derivative thereof.

2. The method of claim 1, wherein the salt of a sulfonated (sulfated) vegetable oil is a salt of sulfonated (sulfated) castor oil.

3. The method of claim 2, wherein the salt of the sulfonated (sulfated) vegetable oil is selected from the group consisting of sodium, potassium, calcium, magnesium and ammonium salts.

4. The method of claim 1, wherein the surfactant is non-ionic.

5. The method of claim 4, wherein the non-ionic surfactant is an ethoxylated alcohol.

6. The method of claim 5, wherein the non-ionic surfactant is an ethoxylate of alkyl polyethylene glycol ether.

7. The method of claim 6, wherein the non-ionic surfactant is a $C_{10}$ alcohol ethoxylate.

8. The method of claim 7, wherein the $C_{10}$ alcohol ethoxylate contains eight ethylene oxide units.

9. The method of claim 1, wherein a freezing point depressant is further added to the brine.

10. The method of claim 9, wherein the freezing point depressant is a $C_1$-$C_8$ alcohol, glycol, polyglycol or glycol ether.

11. The method of claim 10, wherein the freezing point depressant is a glycol ether.

12. The method of claim 1, wherein the surfactant is an anionic surfactant.

13. A method of increasing the lubricity or reducing the coefficient of friction of a completion fluid containing a brine by adding to the completion fluid at least one water-soluble salt of a sulfonated (sulfated) vegetable oil or derivative thereof and a surfactant, wherein the surfactant solubilizes the salt of the sulfonated (sulfated) vegetable oil or derivative thereof.

14. The method of claim 13, wherein the salt of a sulfonated (sulfated) vegetable oil is a salt of sulfonated (sulfated) castor oil.

15. The method of claim 14, wherein the salt of the sulfonated (sulfated) vegetable oil is selected from the group consisting of sodium, potassium, calcium, magnesium and ammonium salts.

16. The method of claim 13, wherein the surfactant is non-ionic.

17. The method of claim 16, wherein the non-ionic surfactant is an ethoxylated alcohol.

18. The method of claim 17, wherein the non-ionic surfactant is an ethoxylate of alkyl polyethylene glycol ether.

19. The method of claim 18, wherein the non-ionic surfactant is a $C_{10}$ alcohol ethoxylate.

20. The method of claim 19, wherein the $C_{10}$ alcohol ethoxylate contains eight ethylene oxide units.

21. A method of increasing the lubricity or reducing the coefficient of friction of a drilling or completion fluid containing a brine by adding to the drilling or completion fluid at least one water-soluble salt of a sulfonated (sulfated) vegetable oil or derivative thereof and an anionic or non-ionic surfactant, wherein the anionic or non-ionic surfactant solubilizes the salt of said sulfonated (sulfated) vegetable oil or derivative thereof.

22. The method of claim 21, wherein the salt of a sulfonated (sulfated) vegetable oil is a salt of a sulfonated (sulfated) vegetable oil.

23. The method of claim 22, wherein the salt of a sulfonated (sulfated) vegetable oil is a salt of sulfonated (sulfated) castor oil.

24. The method of claim 23, wherein the salt of sulfonated (sulfated) vegetable oil is selected from the group consisting of sodium, potassium, calcium, magnesium and ammonium salts.

25. The method of claim 21, wherein the surfactant is non-ionic.

26. The method of claim 25, wherein the non-ionic surfactant is an ethoxylated alcohol.

27. The method of claim 26, wherein the non-ionic surfactant is an ethoxylate of alkyl polyethylene glycol ether.

28. The method of claim 27, wherein the non-ionic surfactant is a $C_{10}$ alcohol ethoxylate.

29. The method of claim 28, wherein the $C_{10}$ alcohol ethoxylate contains eight ethylene oxide units.

30. The method of claim 21, wherein a freezing point depressant is further added to the brine.

31. The method of claim 21, wherein the fluid is a completion fluid.

* * * * *